(12) United States Patent
Mekid

(10) Patent No.: US 8,726,740 B1
(45) Date of Patent: May 20, 2014

(54) MULTI-AXIS DYNAMOMETER

(71) Applicant: King Fahd University of Petroleum and Minerals, Dhahran (SA)

(72) Inventor: Samir Mekid, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 13/714,252

(22) Filed: Dec. 13, 2012

(51) Int. Cl.
*G01D 7/00* (2006.01)

(52) U.S. Cl.
USPC ..................................... 73/862.041

(58) Field of Classification Search
USPC ..................................... 73/862.041
See application file for complete search history.

(56) References Cited

U.S. PATENT DOCUMENTS

| | | | |
|---|---|---|---|
| 2,866,333 A * | 12/1958 | Dudenhausen | 73/862.042 |
| 3,640,130 A * | 2/1972 | Spescha et al. | 73/862.043 |
| 3,693,425 A | 9/1972 | Starita et al. | |
| 4,094,192 A | 6/1978 | Watson et al. | |
| 4,493,220 A | 1/1985 | Carignan et al. | |
| 4,667,520 A * | 5/1987 | Fraser et al. | 73/862.042 |
| 4,802,274 A | 2/1989 | Petrof et al. | |
| 4,899,594 A * | 2/1990 | Wolfer et al. | 73/862.06 |
| 5,814,740 A | 9/1998 | Cook et al. | |
| 5,821,432 A * | 10/1998 | Sidler et al. | 73/862.043 |
| 6,038,933 A | 3/2000 | Meyer | |
| 7,536,924 B2 | 5/2009 | Schmitz et al. | |
| 2004/0258495 A1 | 12/2004 | Kakino et al. | |

* cited by examiner

*Primary Examiner* — Lisa Caputo
*Assistant Examiner* — Octavia Davis-Hollington
(74) *Attorney, Agent, or Firm* — Richard C Litman

(57) ABSTRACT

The multi-axis dynamometer provides detailed information regarding the forces developed between the machine tool or bit and the workpiece during machining operations. Force sensing is provided along three mutually orthogonal axes, sensing being provided in opposite directions along two of the axes. A housing is split along its diagonal to form two portions that connect together at one corner, a clamp bolt adjustably securing the two opposite corners together. A workpiece holder receptacle is provided between the two portions, and a workpiece fits closely within the receptacle. Four sensors are installed on the four walls of the receptacle, and a fifth sensor is installed on the floor of the receptacle. Preload is applied to the sensors by adjusting the clamping force of the clamp bolt. Motion of the workpiece during machining operations produces forces upon the sensors, the sensor output being received by a microcontroller and transmitted for further use.

20 Claims, 6 Drawing Sheets

MULTI-AXIS DYNAMOMETER

BACKGROUND OF THE INVENTION

1. Field of the Invention

The present invention relates generally to force measurement devices, and particularly to a small multi-axis dynamometer that is particularly useful in the measurement of forces developed between a workpiece and a machine tool during machining operations involving very small components.

2. Description of the Related Art

It is well known that a number of different forces are developed between a machine tool and the workpiece being machined during machining operations. These forces are well known for larger machining operations, but may be even more critical during the machining of small components. In the case of machining small objects, the cutting or machining tool must rotate at relatively high RPM, perhaps on the order of tens of thousands of RPM, in order to provide the desired cutting speed due to the small diameter of the cutting tool.

Of course, such very small cutting tools and bits are relatively delicate and are subject to damage and breakage if slightly greater force is exerted than is optimum. Among many factors, the sharpness of the cutting tool or bit is directly related to the force that must be imparted to the workpiece during machining operations. When the cutting tool becomes even slightly dulled, cutting efficiency decreases considerably and other negative conditions increase, e.g., the heat generated during the machining operation due to friction. Different materials require different cutting speeds and feed rates for optimum efficiency. All of these factors will result in different pressures being exerted on the workpiece by the cutting tool. Moreover, any resonant frequencies developed during the machining operation will be quite high, given the rotational speed of such small size cutting tools and bits. The difficulty in measuring these forces on such a small scale is apparent.

Thus, a multi-axis dynamometer solving the aforementioned problems is desired.

SUMMARY OF THE INVENTION

The multi-axis dynamometer is particularly well adapted for the sensing of relatively small forces on the order of several newtons (N) or less, e.g., about 15 N (or about 3.3 pounds) maximum. The device comprises a split housing defining a receptacle with the shape of a rectangular solid having five solid surfaces comprising four sides and the bottom or floor of the receptacle. Piezoelectric sensors are installed upon the four sides and floor to detect pressures applied in those orientations. A workpiece holder in the form of a rectangular solid fits closely within the receptacle and bears against the sensors according to forces applied to the workpiece holder during machining operations by the workpiece installed thereon. The two components of the split housing may be adjusted to bear against the workpiece holder therein to provide a preload on the four sensors installed on the sides of the housing receptacle. Preload is developed on the sensor installed on the floor of the device by adjusting the pressure of a lower plate comprising the floor of the assembly.

Each of the five sensors sends its signal to a corresponding operational amplifier, which amplifies the signal and passes it to a microcontroller for processing. The processed signals are then sent to a computer, either by hard wiring or by a wireless transmitter provided with the microcontroller. The above-described circuitry comprising the sensors, their amplifiers, the microcontroller, and the transmitter may be located physically within the housing of the device. Power may be provided by an electrical storage cell or battery located with the above-described circuitry, or by an external power source.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The multi-axis dynamometer is a device for sensing the forces developed along three mutually orthogonal axes, the forces being sensed in opposite directions along two of the three axes. The device may be used in many different fields, but is particularly well suited for use in holding a small workpiece during machining operations in order to sense, and therefore avoid, forces that might otherwise damage small cutting tools and bits, and also to provide better surface finishes for the machined workpieces. The preferred sensors provide force sensing to about 15 N, or about 3.3 pounds, with a resolution of about 0.1 N, or about one third of an ounce of force.

Figure 1:
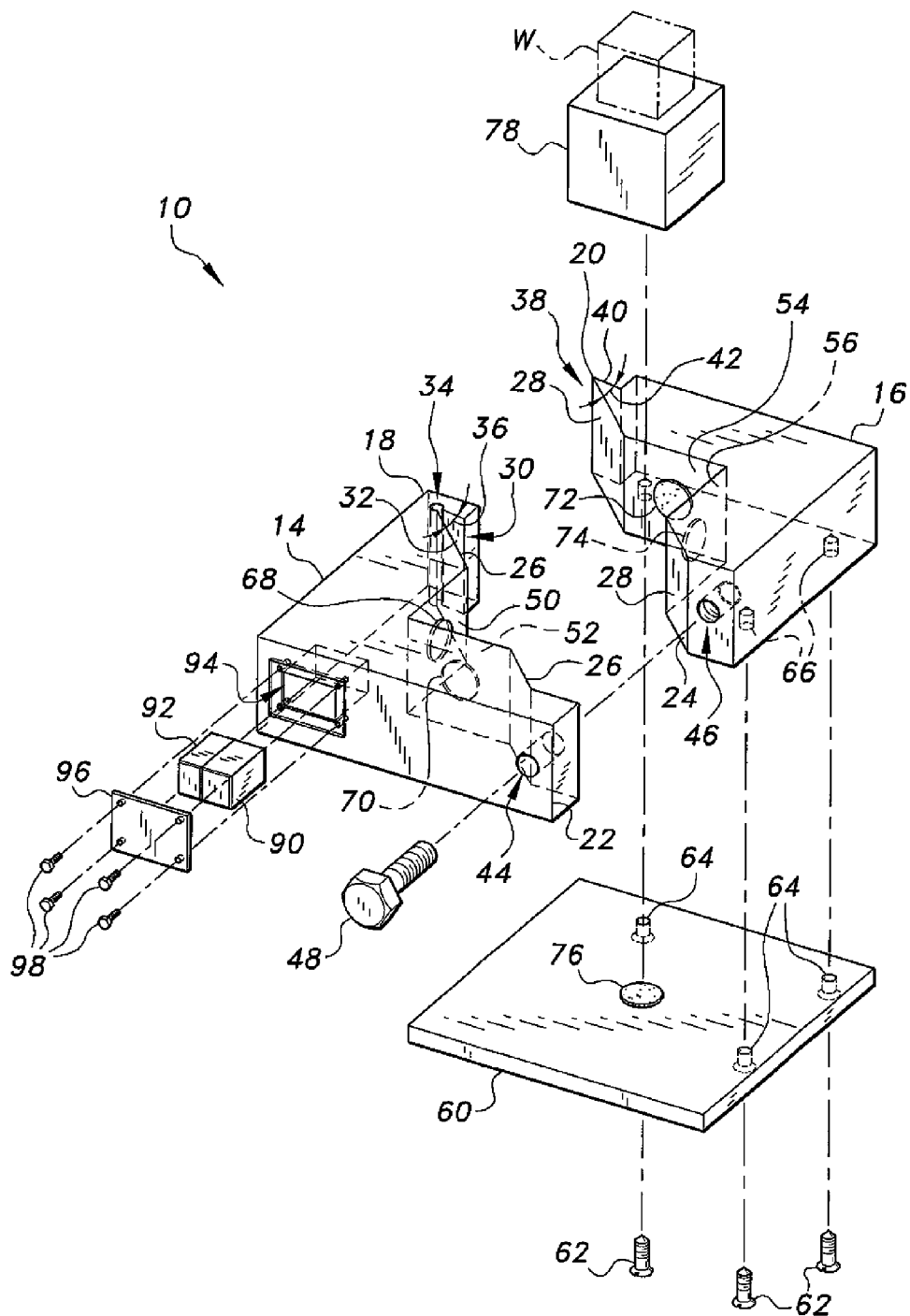
FIG. 1 is an exploded perspective view of a first embodiment of a multi-axis dynamometer according to the present invention, illustrating its various components and their relationships to one another.
Figure 2:
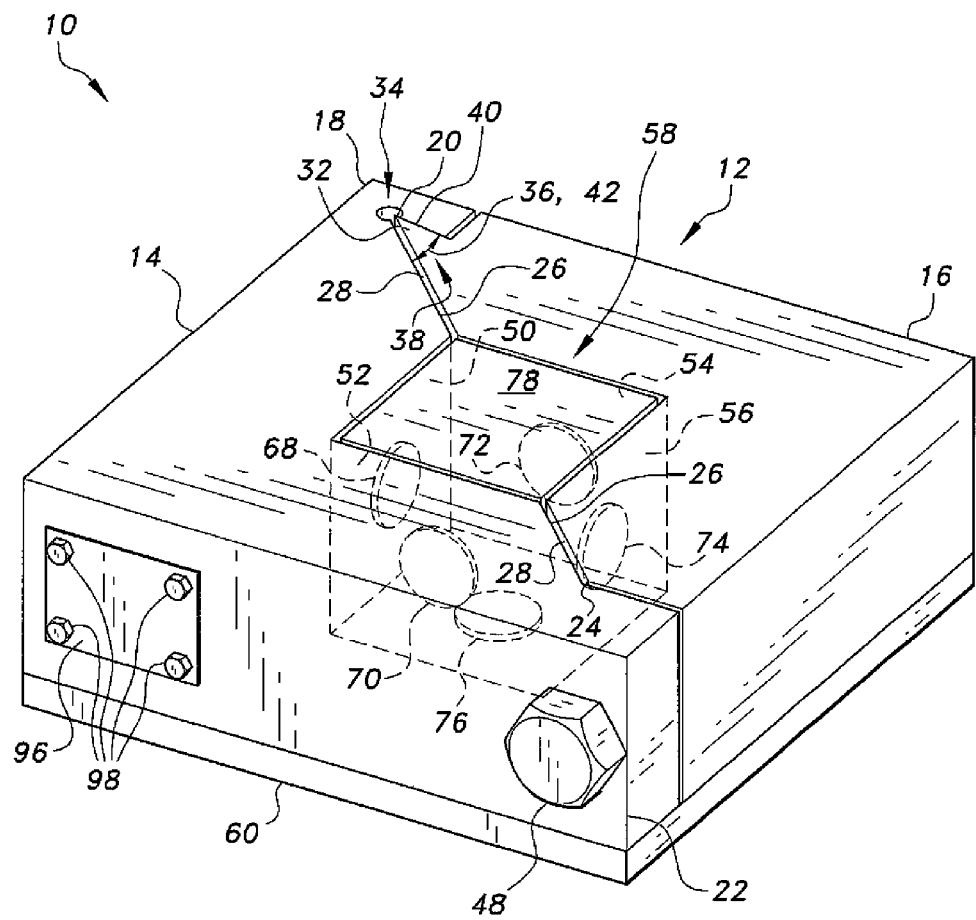
FIG. 2 is a perspective view of the multi-axis dynamometer of FIG. 1, shown in its assembled state.
Figure 3:
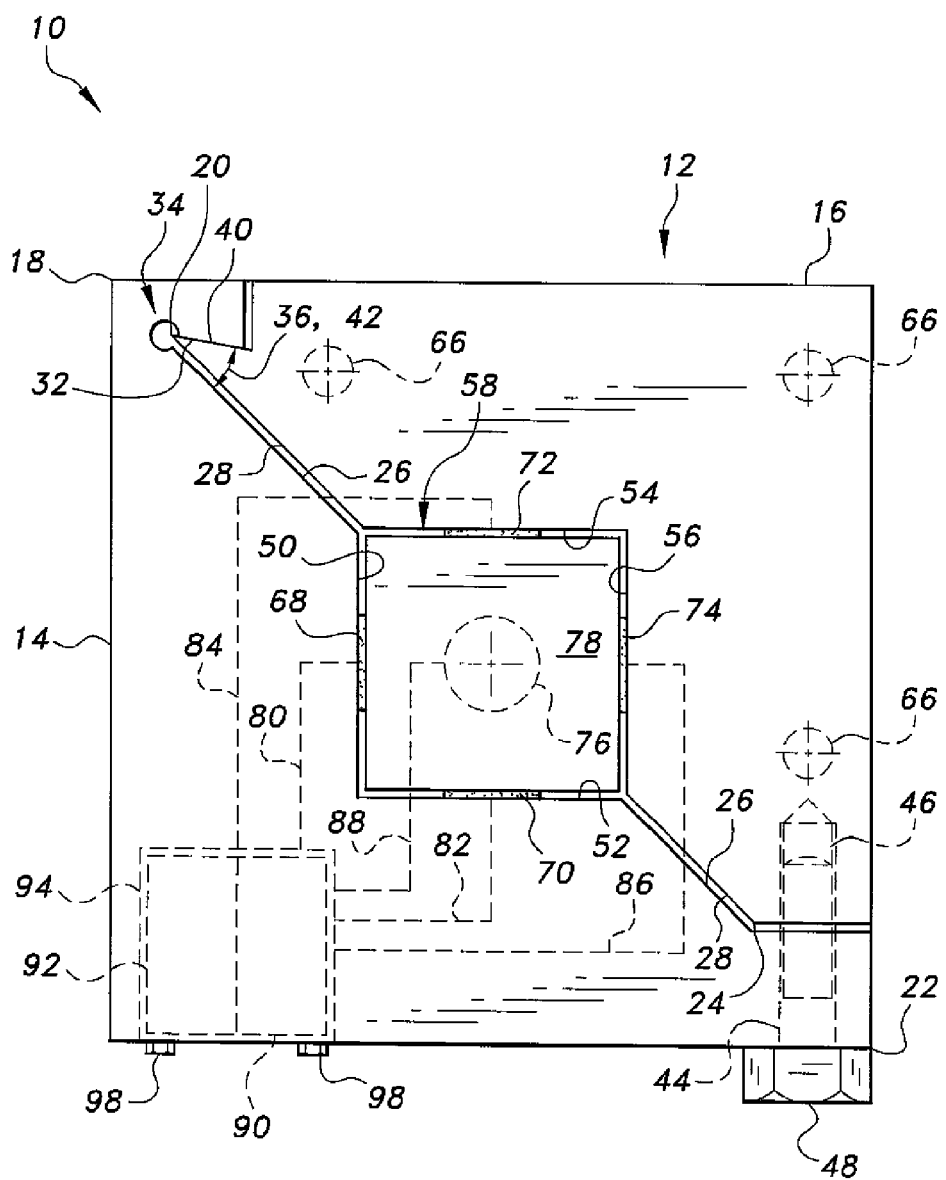
FIG. 3 is a top plan view of the multi-axis dynamometer of FIGS. 1 and 2.

FIGS. 1 through 3 provide an exploded perspective view, an assembled perspective view, and a top plan view, respectively, of a first embodiment of the multi-axis dynamometer 10. The dynamometer 10 includes a housing 12 (FIGS. 2 and 3) formed of a first housing portion 14 and a second housing portion 16. The housing 12 may have any practicable external shape, but in the example of FIGS. 1 through 3, the housing 12 has a substantially square planform when assembled, as shown in FIGS. 2 and 3.

Each housing portion 14 and 16 includes a connecting corner 18 and 20 and a diagonally opposite clamp bolt corner 22 and 24. The respective corners define a diagonal face therebetween, i.e., the connecting corner 18 and clamp bolt corner 22 of the first portion 14 define a first portion diagonal face 26 and the connecting corner 20 and clamp bolt corner 24 of the second portion 16 define a second portion diagonal face 28.

The connecting corner 18 of the first housing portion 14 generally comprises a wedge-shaped receptacle 30 (shown in FIG. 1) defined by the diagonal face 26 of the first housing portion 14 and a first latch surface 32 extending from a relief hole 34 at the junction of the diagonal face 26 and the latch surface 32. The diagonal face and first latch surface define an acute receptacle angle 36 therebetween. The connecting corner 20 of the second housing portion 16 generally comprises a wedge 38 defined by the diagonal face 28 of the second housing portion and a second latch surface 40 extending from the diagonal face 28. The diagonal face 28 and second latch surface 40 define an acute wedge angle 42 therebetween. The two angles 42 and 36 are identical. The two housing portions 14 and 16 are connected at their mating corners 18 and 20 by placing the wedge 38 of the second portion 16 into the receptacle 30 of the first portion 14 with the second latch surface 40 bearing against the first latch surface 32, which, when fastened at their respective clamp bolt corners 22 and 24, precludes separation of the two housing portions 14 and 16.

The corners diagonally opposite the connecting corners 18 and 20 described above are secured to one another with an adjustable clamping bolt. The clamp bolt corner 22 of the first housing portion 14 has an unthreaded clamp bolt passage 44 therethrough, and the clamp bolt corner 24 of the second housing portion 16 has a threaded clamp bolt receptacle 46 therein. A clamp bolt 48 is adjustably installed through the passage 44 and into the receptacle 46. Tightening the clamp bolt 48 draws the two housing portions 14 and 16 more closely together with their diagonal faces 26 and 28 abutting one another, as shown in FIGS. 2 and 3. There may be a slight gap between the two diagonal faces, depending upon the structure and dimensions of other components installed within the housing 12, as discussed further below.

Each of the housing portions 14 and 16 includes a workpiece holder receptacle portion formed in the diagonal face thereof. The first housing portion 14 has a workpiece holder receptacle portion defined by two mutually orthogonal first and second walls 50 and 52, while the second housing portion 16 has a workpiece holder receptacle portion defined by two mutually orthogonal third and fourth walls 54 and 56. The third and fourth walls 54 and 56 of the second housing portion 16 are mirror image to the first and second walls 50 and 52 of the first housing portion 14, so that the four walls 50 through 56 define a rectangular (and preferably square) workpiece holder receptacle 58 when the two housing portions 14 and 16 are assembled, as shown in FIGS. 2 and 3.

A base plate 60 attaches to the bottom of the second housing portion 16 and forms a floor for the workpiece holder receptacle 58. The base plate 60 preferably has substantially the same planform as the assembled housing 12. The base plate 60 attaches to only one of the two portions of the housing 12, e.g., to the second housing portion 16, to allow the two housing portions 14 and 16 to be adjusted relative to one another. A plurality of screws 62 pass through corresponding passages 64 in the plate 60 and thread into corresponding receptacles 66 in the bottom of the second housing portion 16 to secure the plate 60 to the second housing portion 16. The plate 60 is therefore free to slide relative to the bottom surface of the first housing portion 14. The screws 62 are preferably flat head, and the plate passages 64 are countersunk to provide an unbroken bottom surface for the plate 60.

A plurality of pressure or force sensors (which may be force-sensing or force-sensitive resistors, piezoresistive devices, or any device that changes its electrical resistance in response to applied force or pressure) are installed upon the first through fourth walls 50 through 56 and on the base plate 60 forming the floor of the workpiece holder receptacle 58. The sensors comprise first through fourth sensors 68 through 74 installed upon the corresponding first through fourth walls 50 through 56, and a fifth sensor 76 installed upon the base plate or floor 60 of the workpiece holder receptacle 58. The preferred force sensors are limited to a maximum force input of about 15 N, or about 3.3 pounds, and preferably have a resolution of about 0.1 N, or about one-third of an ounce of force or pressure.

A workpiece holder 78 is removably installed within its receptacle 58. The workpiece holder is configured and dimensioned to fit closely between the sensors 68 through 74 on the walls 50 through 56 of the workpiece holder receptacle 58, i.e., having a rectangular solid configuration. A workpiece W, exemplified by the rectangular solid form illustrated in broken lines in FIG. 1, is secured (adhesively attached, clamped, etc.) to the workpiece holder 78. Thus, forces applied to the workpiece W are transferred to the workpiece holder 78 and applied to the various sensors 68 through 76.

These forces are converted to electrical voltages, and passed to a microcontroller via appropriate wiring connections, i.e., wires or leads 80 through 88 for the respective first through fifth sensors 68 through 76, as shown in broken lines in FIG. 3. The sensor leads 80 through 88 connect to a microcontroller 90 and other processing circuitry. An electrical storage battery or cell 92 may be provided to power the electronic circuitry of the system, or another electrical power source may be provided alternatively. The microcontroller 90 and battery or cell 92 (if provided) may be contained in an electronics compartment 94 formed in the housing 12. A cover 96 is secured by screws 98 (or other suitable means) to close the compartment 94.

Figure 6:
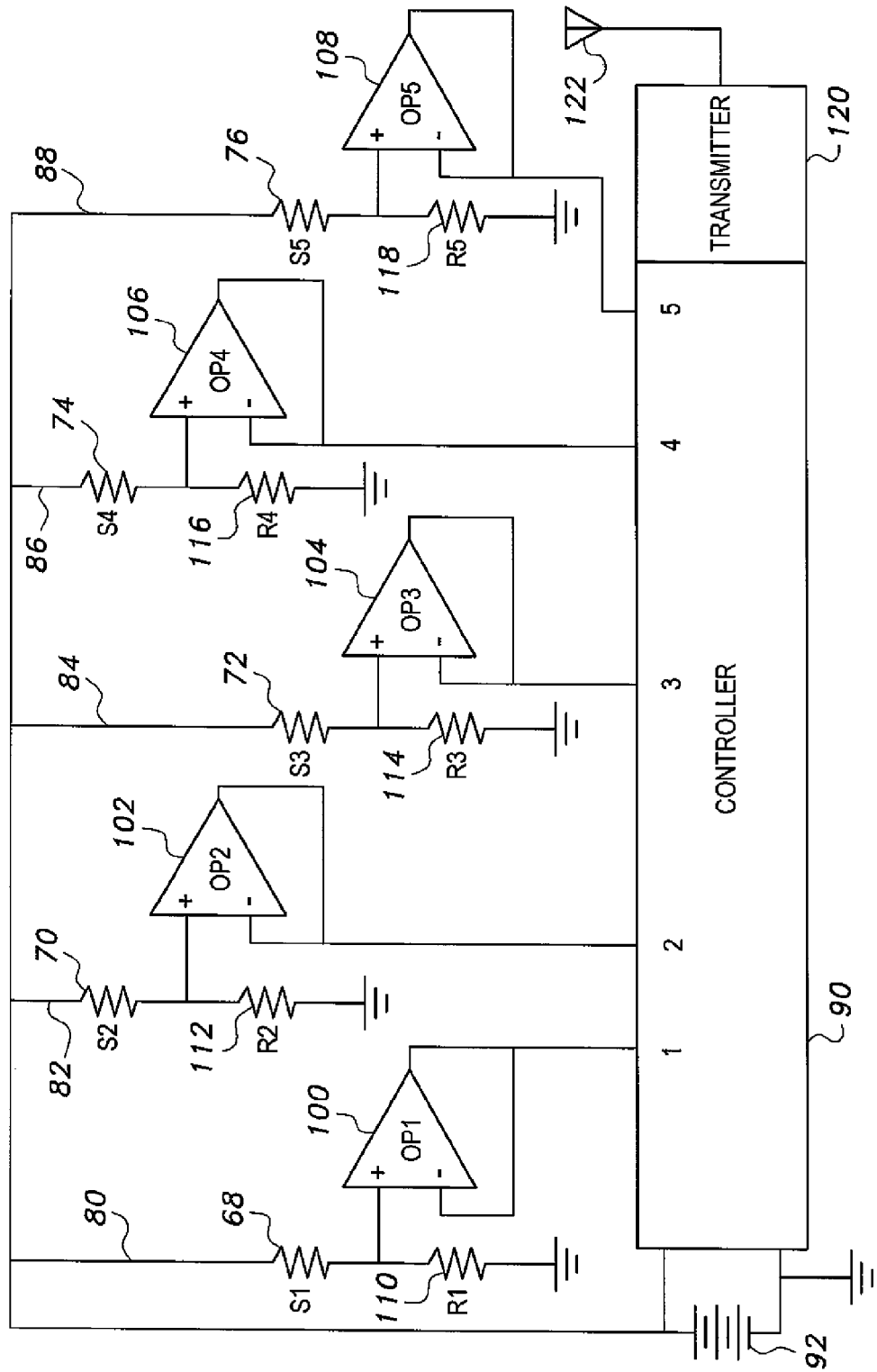
FIG. 6 is an electrical schematic drawing of the circuitry incorporated within a multi-axis dynamometer according to the present invention.

FIG. 6 provides a schematic diagram of the electrical circuitry for the system. Each of the force sensors 68 through 76, indicated as resistances S1 through S5 in FIG. 6, connects to an operational amplifier, respectively 100 through 108, indicated as operational amplifiers OP1 through OP5 in FIG. 6. Each of the sensors 68 through 76 forms a voltage divider with additional resistors 110 through 118, designated as resistors R1 through R5 in FIG. 6 that provides a voltage to the non-inverting input of the corresponding operational amplifier 100 through 108. The sensors 68 through 76 act as variable resistors having a resistance proportional to the force or pressure applied to the sensor. The corresponding operational amplifier 100 through 108 amplifies the voltage and provides the amplified voltage as an input to the microcontroller 90. In the circuit diagram of FIG. 6, it will be seen that an increase of force on any of the sensors 68 through 76 will result in an increase in voltage to the respective operational amplifier due to the resistance of the resistors 110 through 118. The circuit is previously calibrated so that the controller associates the voltage level with the corresponding force applied to the sensor.

The microcontroller 90 processes the signals from the sensors 68 through 76 via the operational amplifiers 100 through 108, with the processed data passing to a transmitter 120. Examples of suitable transmitters are the Xbee Digimesh 2.4 or Xbee-PRO Digimesh 2.4, both of which transmit on a frequency of 2.4 gHz (gigaHertz), with the Xbee-PRO providing somewhat higher output power. The Xbee transmitters are manufactured by Digi International of Minnetonka, Minn.. Other transmitter types, manufacturers, and/or frequencies may be used as desired. The transmitter 120 provides an RF signal to an antenna 122 for wireless transmittal to an appropriate receiver, e.g., wireless server for a computer, etc. Alternatively, the microcontroller 90 may be hard wired to the receiving unit (computer, etc.), to eliminate the need for the transmitter 120 and antenna 122.

Figure 4:
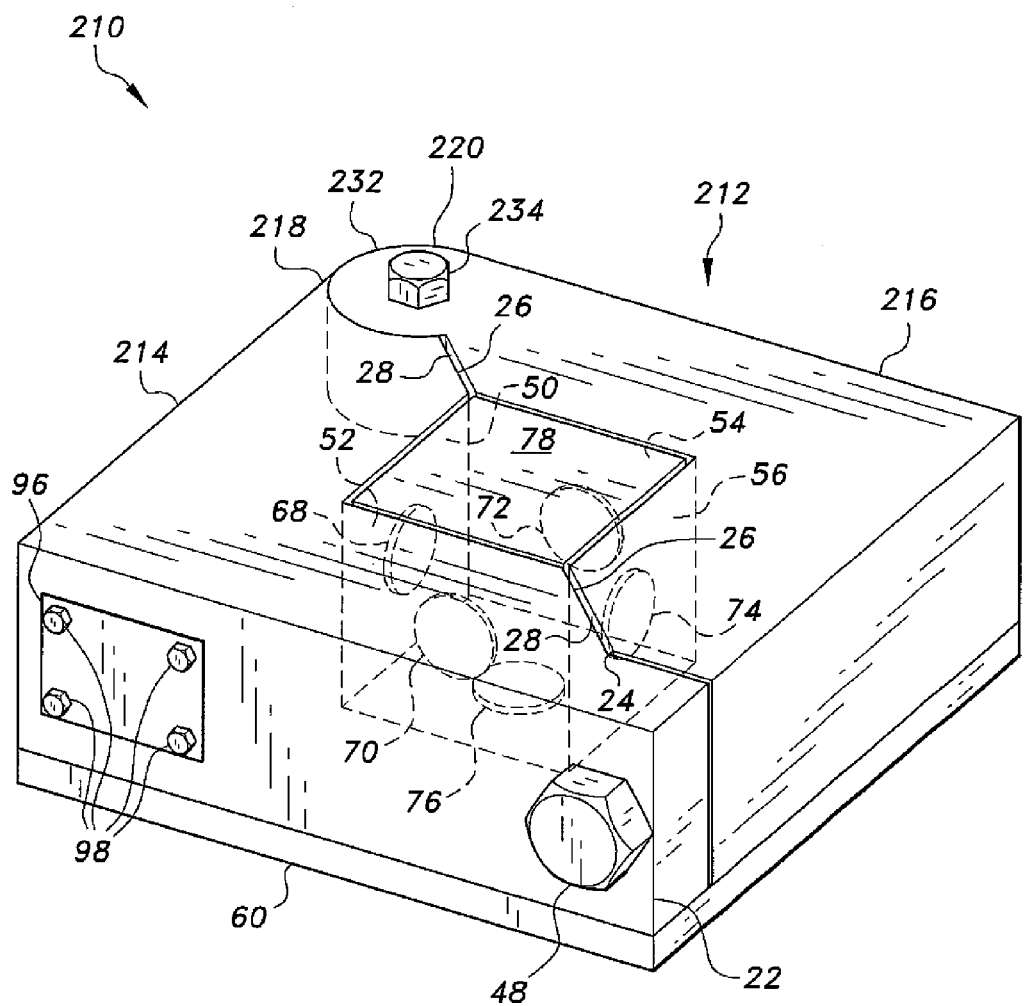
FIG. 4 is a perspective view of an alternative embodiment of a multi-axis dynamometer according to the present invention, having an alternative connector between the housing portions.
Figure 5:
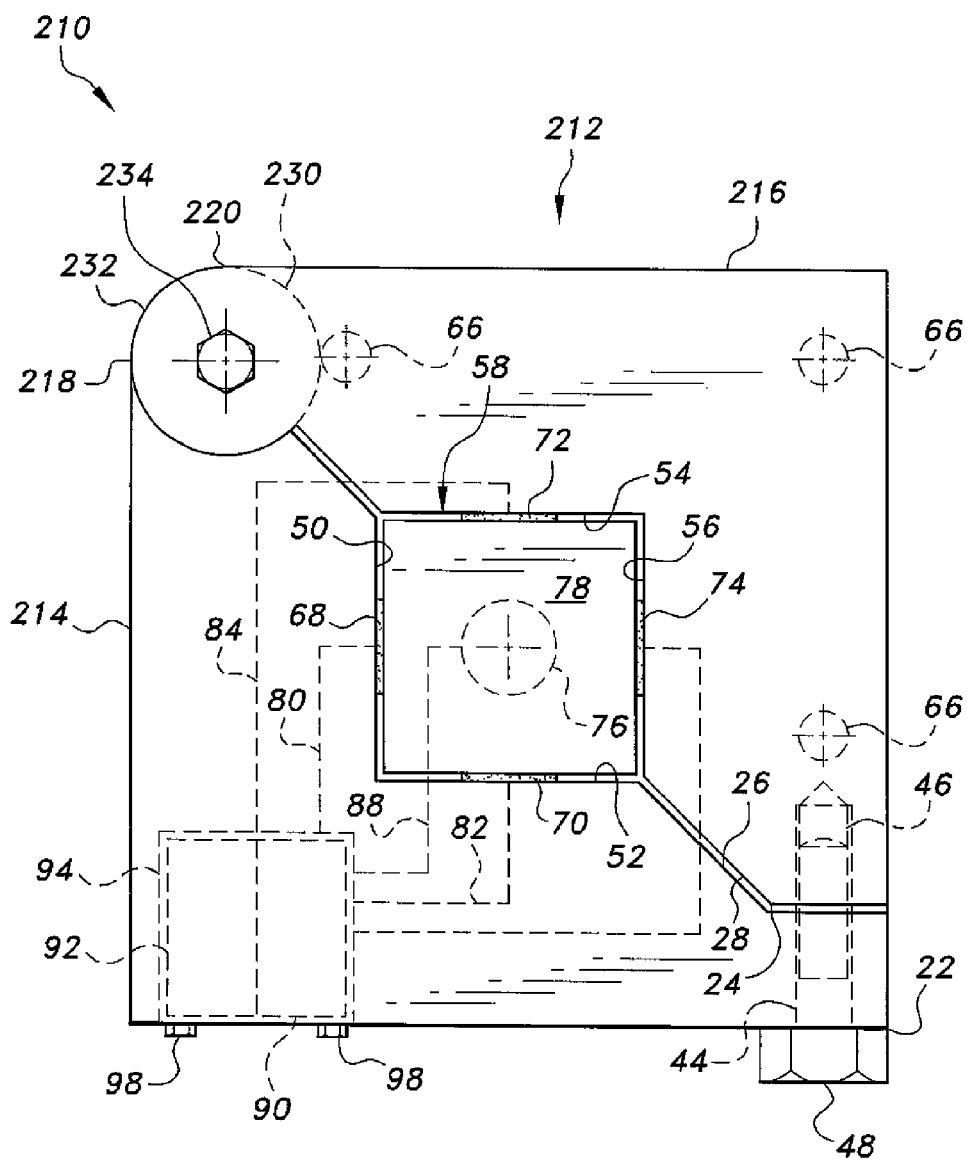
FIG. 5 is a top plan view of the multi-axis dynamometer of FIG. 4.

FIGS. 4 and 5 of the drawings illustrate a second embodiment of the multi-axis dynamometer, designated as dynamometer 210. The dynamometer 210 includes most of the structure and components of the dynamometer 10 of FIGS. 1 through 3, with like structure and components of the two embodiments 10 and 210 being indicated by like reference numerals in all of the drawings. However, the housing 212 of the dynamometer 210 has a different mechanism for the attachment of its two housing portions 214 and 216 to one another at their connecting corners 118 and 120. The multi-axis dynamometer 210 of FIGS. 4 and 5 has a first hinge lug 230 extending outward from the lower portion of the diagonal face 26 of the first housing portion 214, the first hinge lug being shown in broken lines in FIG. 5. A second hinge lug 232 extends outward from the upper portion of the diagonal face 28 of the second housing portion 216, the two hinge lugs 230 and 232 overlapping one another. A concentric hinge pin passage is formed through the two lugs 230 and 232, and a hinge pin (bolt, etc.) 234 passes through the two lugs 230 and 232 to secure the lugs, and thus the two housing portions 214 and 216, together. The two housing portions 214, 216 thus pivot relative to one another about their mutual hinge pin 234. The adjustable closure of the two housing portions is achieved by the clamp bolt 48 in the manner described further above for the first embodiment 10 of FIGS. 1 through 3.

The multi-axis dynamometer 10 or 210 is used to sense the forces or pressures developed during machining operations, particularly when machining relatively small components requiring relatively low cutting or machining pressures or forces. The workpiece holder 78 is installed within its receptacle 58, and the clamp bolt 48 is tightened as desired to achieve the desired preload on the various force sensors 68 through 76. Preload is developed on the fifth sensor 76 on the floor of the receptacle 58 according to the friction developed between the first four sensors 68 through 74 on the walls of the receptacle as they grip the workpiece holder 78 therebetween. The workpiece W is installed atop the holder 78 using any practicable attachment means, and the dynamometer 10 or 210 is secured to the machining platform or table for the machining operation.

The very fine force resolution provided by the sensors 68 through 76 enables the machinist or operator to detect any slight anomalies in the expected forces required during normal machining operations, as when a machine tool or bit is becoming dull, insufficient cutting oil or lubricant is being provided, too great a cutting speed is being used, or for whatever reason that may occur. The sensing of forces developed along both directions of the mutually orthogonal horizontal axes and the force developed by downward pressure enable the machinist or operator to monitor these forces, or some combination thereof, during the machining operation. The high frequency at which the sensor circuits are capable of operating enable the machinist or operator to detect adverse conditions, such as tool chatter during the machining operation, even when rotational speeds of tens of thousands of rpm are used with very small diameter cutting tools or bits. Accordingly, the machinist or operator may suspend the machining operation and rectify the situation before major damage occurs, such as breaking off a tool bit in the workpiece, overheating the workpiece, or otherwise damaging and possibly ruining the workpiece.

It is to be understood that the present invention is not limited to the embodiments described above, but encompasses any and all embodiments within the scope of the following claims.

I claim:

1. A multi-axis dynamometer, comprising:
    a housing having first, second, third, and fourth interior walls and a floor, the walls and the floor defining a rectangular workpiece holder receptacle;
    first, second, third, and fourth force sensors disposed respectively upon the first through fourth interior walls of the housing;
    a fifth pressure sensor disposed upon the floor of the housing; and
    a workpiece holder having a rectangular solid configuration, the workpiece holder being adapted to fit closely within the workpiece holder receptacle, the workpiece holder bearing variably against the first through fifth pressure sensors according to forces applied to the workpiece holder when the workpiece holder is installed in the workpiece holder receptacle.

2. The multi-axis dynamometer according to claim 1, wherein the housing comprises:
    a first housing portion having a connecting corner, a clamp bolt corner diagonally opposite the connecting corner, and a diagonal face extending therebetween;
    a second housing portion having a connecting corner, a clamp bolt corner diagonally opposite the connecting corner, and a diagonal face extending therebetween, the connecting corner of the second housing portion connecting with the connecting corner of the first housing portion, the diagonal face of the second housing portion abutting the diagonal face of the first housing portion;
    a clamp bolt passage disposed through the clamp bolt corner of the first housing portion;
    a threaded clamp bolt receptacle disposed in the clamp bolt corner of the second housing portion; and
    a clamp bolt adjustably disposed through the clamp bolt passage of the first housing portion and into the clamp bolt receptacle of the second housing portion, the first housing portion having a workpiece holder receptacle portion disposed in the diagonal face thereof, the workpiece holder receptacle portion having mutually orthogonal first and second walls, and the second housing portion having a workpiece holder receptacle portion disposed in the diagonal face thereof, the workpiece holder receptacle portion having mutually orthogonal third and fourth walls, the workpiece holder receptacle portions of the first and second housing portions defining the rectangular workpiece holder receptacle when the first and second housing portions are assembled with one another.

3. The multi-axis dynamometer according to claim 2, further comprising a base plate adjustably secured to the second housing portion, the base plate extending beneath the first and second housing portions and the workpiece holder receptacle portions thereof and serving as the floor for the workpiece holder receptacle.

4. The multi-axis dynamometer according to claim 2, wherein:
    the connecting corner of the first housing portion comprises a wedge-shaped receptacle defined by the diagonal face of the first housing portion and a first latch surface, the diagonal face and the first latch surface defining an acute receptacle angle therebetween; and
    the connecting corner of the second housing portion comprises a wedge defined by the diagonal face of the second housing portion and a second latch surface, the diagonal face of the second housing portion and the second latch surface defining an acute wedge angle therebetween, the wedge of the second housing portion being disposed in the receptacle of the first housing portion and the second latch surface bearing against the first latch surface when the second housing portion is assembled with the first housing portion.

5. The multi-axis dynamometer according to claim 2, further comprising:
- a first hinge lug extending from the connecting corner of the first housing portion;
- a second hinge lug extending from the connecting corner of the second housing portion, the first hinge lug and the second hinge lug overlapping one another when the first housing portion and the second housing portion are assembled with one another; and
- a hinge pin disposed through the first hinge lug and the second hinge lug, the hinge pin connecting the first housing portion to the second housing portion.

6. The multi-axis dynamometer according to claim 1, further comprising:
- a microcontroller communicating electronically with each of the force sensors;
- an operational amplifier disposed between each of the force sensors and the microcontroller; and
- a transmitter communicating electronically with the microcontroller.

7. The multi-axis dynamometer according to claim 1, wherein each of the force sensors is a device having an electrical resistance proportional to mechanical force applied to the sensor.

8. A multi-axis dynamometer, comprising:
- a first housing portion having a connecting corner, a clamp bolt corner diagonally opposite the connecting corner, and a diagonal face extending therebetween, the first housing portion having a workpiece holder receptacle portion disposed in the diagonal face thereof, the workpiece holder receptacle portion having mutually orthogonal first and second walls;
- a second housing portion having a connecting corner, a clamp bolt corner diagonally opposite the connecting corner, and a diagonal face extending therebetween, the connecting corner of the second housing portion connecting with the connecting corner of the first housing portion, the diagonal face of the second housing portion abutting the diagonal face of the first housing portion, the second housing portion having a workpiece holder receptacle portion disposed in the diagonal face thereof, the workpiece holder receptacle portion having mutually orthogonal third and fourth walls, the workpiece holder receptacle portions of the first and second housing portions defining a rectangular workpiece holder receptacle when the first and second housing portions are assembled with one another;
- a clamp bolt passage disposed through the clamp bolt corner of the first housing portion;
- a threaded clamp bolt receptacle disposed in the clamp bolt corner of the second housing portion;
- a clamp bolt adjustably disposed through the clamp bolt passage of the first housing portion and into the clamp bolt receptacle of the second housing portion;
- first, second, third, and fourth force sensors disposed respectively upon the first through fourth walls of the workpiece holder receptacle; and
- a workpiece holder having a rectangular solid configuration, the workpiece holder being adapted to fit closely within the workpiece holder receptacle, the workpiece holder bearing variably against the first through fourth force sensors according to forces applied to the workpiece holder when the workpiece holder is installed in the workpiece holder receptacle.

9. The multi-axis dynamometer according to claim 8, wherein:
- the connecting corner of the first housing portion comprises a wedge-shaped receptacle defined by the diagonal face of the first housing portion and a first latch surface, the diagonal face and the first latch surface defining an acute receptacle angle therebetween; and
- the connecting corner of the second housing portion comprises a wedge defined by the diagonal face of the second housing portion and a second latch surface, the diagonal face of the second housing portion and the second latch surface defining an acute wedge angle therebetween, the wedge of the second housing portion being disposed in the receptacle of the first housing portion and the second latch surface bearing against the first latch surface when the second housing portion is assembled with the first housing portion.

10. The multi-axis dynamometer according to claim 8, further comprising:
- a first hinge lug extending from the connecting corner of the first housing portion;
- a second hinge lug extending from the connecting corner of the second housing portion, the first hinge lug and the second hinge lug overlapping one another when the first housing portion and the second housing portion are assembled with one another; and
- a hinge pin disposed through the first hinge lug and the second hinge lug, the hinge pin connecting the first housing portion to the second housing portion.

11. The multi-axis dynamometer according to claim 8, further comprising:
- a base plate disposed beneath the first and second housing portions and the workpiece holder receptacle defined therein, the base plate serving as a floor for the workpiece holder receptacle; and
- a fifth force sensor disposed upon the base plate, within the workpiece receptacle.

12. The multi-axis dynamometer according to claim 11 wherein the base plate is adjustably secured to the second housing portion, the base plate extending beneath the first and second housing portions and the workpiece holder receptacle portions thereof.

13. The multi-axis dynamometer according to claim 8, further comprising:
- a microcontroller communicating electronically with each of the force sensors;
- an operational amplifier disposed each of the force sensors and the microcontroller; and
- a transmitter communicating electronically with the microcontroller.

14. The multi-axis dynamometer according to claim 8, wherein each of the force sensors is a device having an electrical resistance proportional to mechanical force applied to the sensor.

15. A multi-axis dynamometer, comprising:
- a first housing portion having a connecting corner, a clamp bolt corner opposite the connecting corner, and a workpiece holder receptacle portion therebetween;
- a second housing portion having a connecting corner, a clamp bolt corner opposite the connecting corner, and a workpiece holder receptacle portion therebetween, the connecting corner of the second housing portion connecting with the connecting corner of the first housing portion;
- a clamp bolt passage disposed through the clamp bolt corner of the first housing portion;
- a threaded clamp bolt receptacle disposed in the clamp bolt corner of the second housing portion;

a clamp bolt adjustably disposed through the clamp bolt passage of the first housing portion and into the clamp bolt receptacle of the second housing portion;

a base plate adjustably secured to the second housing portion, the base plate extending beneath the first and second housing portions and the workpiece holder receptacle portions thereof and serving as a floor for the workpiece holder receptacle;

the workpiece holder receptacle portions of the first and second housing portions and the base plate defining a workpiece holder receptacle when the first and second housing portions are assembled with one another; and a workpiece holder adapted to fit closely within the workpiece holder receptacle.

16. The multi-axis dynamometer according to claim 15, wherein the workpiece holder receptacle portions of the first housing portion have mutually orthogonal first and second walls and the workpiece holder receptacle portions of the second housing portion have mutually orthogonal third and fourth walls, the first through fourth walls and the base plate defining a rectangular workpiece holder receptacle, the dynamometer further comprising:

first, second, third, and fourth force sensors disposed respectively upon the first through fourth interior walls of the housing portions;

a fifth force sensor disposed upon the base plate of the housing, within the workpiece holder receptacle; and a workpiece holder having a rectangular solid configuration, the workpiece holder being adapted to fit closely within the workpiece holder receptacle, the workpiece holder bearing variably against the first through fifth force sensors according to forces applied to the workpiece holder when the workpiece holder is installed in the workpiece holder receptacle.

17. The multi-axis dynamometer according to claim 16, further comprising:

a microcontroller communicating electronically with each of the force sensors;

an operational amplifier disposed between each of the force sensors and the microcontroller; and a transmitter communicating electronically with the microcontroller, each of the force sensors being a device having an electrical resistance proportional to mechanical force applied to the sensor.

18. The multi-axis dynamometer according to claim 15, wherein:

the connecting corner and the clamp bolt corner of the first housing portion define a diagonal face extending therebetween; and the connecting corner and the clamp bolt corner of the second housing portion define a diagonal face extending therebetween, the diagonal faces of the first and second housing portions abutting one another when the first and second housing portions are assembled with one another.

19. The multi-axis dynamometer according to claim 18, wherein:

the connecting corner of the first housing portion comprises a wedge-shaped receptacle defined by the diagonal face of the first housing portion and a first latch surface, the diagonal face and the first latch surface defining an acute receptacle angle therebetween; and the connecting corner of the second housing portion comprises a wedge defined by the diagonal face of the second housing portion and a second latch surface, the diagonal face of the second housing portion and the second latch surface defining an acute wedge angle therebetween, the wedge of the second housing portion being disposed in the receptacle of the first housing portion and the second latch surface bearing against the first latch surface when the second housing portion is assembled with the first housing portion.

20. The multi-axis dynamometer according to claim 18, further comprising:

a first hinge lug extending from the connecting corner of the first housing portion;

a second hinge lug extending from the connecting corner of the second housing portion, the first hinge lug and the second hinge lug overlapping one another when the first housing portion and the second housing portion are assembled with one another; and a hinge pin disposed through the first hinge lug and the second hinge lug, the hinge pin connecting the first housing portion to the second housing portion.

* * * * *